(12) United States Patent
Omori et al.

(10) Patent No.: US 6,689,465 B1
(45) Date of Patent: Feb. 10, 2004

(54) POROUS BEADS AND PROCESS FOR PRODUCING THE SAME

(75) Inventors: Akihiro Omori, Fuji (JP); Yohsuke Koizumi, Kawasaki (JP)

(73) Assignee: Asahi Kasei Kabushiki Kaisha, Osaka (JP)

(*) Notice: Subject to any disclaimer, the term of this patent is extended or adjusted under 35 U.S.C. 154(b) by 0 days.

(21) Appl. No.: 10/089,847

(22) PCT Filed: Nov. 16, 2000

(86) PCT No.: PCT/JP00/08074
§ 371 (c)(1),
(2), (4) Date: Apr. 4, 2002

(87) PCT Pub. No.: WO01/36522
PCT Pub. Date: May 25, 2001

(30) Foreign Application Priority Data

Nov. 16, 1999 (JP) .............................. 11-325302

(51) Int. Cl.$^7$ ................................. B32B 5/66
(52) U.S. Cl. .................. 428/402; 428/407; 521/56; 521/60; 521/64; 521/65; 521/87; 521/142; 521/144; 521/147; 521/149
(58) Field of Search .................. 428/402, 407; 521/56, 60, 64, 87, 65, 142, 144, 147, 149

(56) References Cited

U.S. PATENT DOCUMENTS

| | | | |
|---|---|---|---|
| 4,110,529 A | | 8/1978 | Stoy |
| 4,904,426 A | | 2/1990 | Lundgard et al. |
| 4,940,734 A | * | 7/1990 | Ley et al. ............... 521/84.1 |
| 4,985,468 A | * | 1/1991 | Elmes et al. ............. 521/63 |
| 5,021,462 A | * | 6/1991 | Elmes et al. ............. 521/63 |
| 5,047,437 A | * | 9/1991 | Cooke ..................... 521/56 |
| 5,314,923 A | * | 5/1994 | Cooke et al. |

FOREIGN PATENT DOCUMENTS

| | | |
|---|---|---|
| EP | 0 265 924 A2 | 5/1988 |
| EP | 0 289 238 A2 | 11/1988 |
| JP | 51-107346 | 9/1976 |
| JP | 63-260935 | 10/1988 |
| JP | 1-278541 | 11/1989 |
| JP | 2-185529 | 7/1990 |
| JP | 3-273038 | 12/1991 |
| JP | 4-170445 | 6/1992 |

* cited by examiner

Primary Examiner—Leszek Kiliman
(74) Attorney, Agent, or Firm—Birch, Stewart, Kolasch & Birch, LLP

(57) ABSTRACT

Disclosed is substantially spherical porous beads of an aromatic polyether ketone resin, which have an average particle diameter of 50 to 5,000 μm and a porosity of 40 to 99%. Also disclosed is a method for producing porous beads, which comprises: mixing, while heating, an aromatic polyether ketone resin with a sol vent capable of dissolving the resin to thereby obtain a resin solution; dispersing the resin solution in a liquid dispersion medium which is incapable of dissolving the resin and is non-miscible with the solvent, to thereby obtain a dispersion having the resin solution dispersed therein in the form of globules; cooling the dispersion while maintaining the dispersed form of the resin solution in the liquid dispersion medium, to thereby solidify the resin in the resin solution; and separating the solidified resin from a mixture of the solvent and the liquid dispersion medium, thereby obtaining substantially spherical porous beads of the aromatic polyether ketone resin.

11 Claims, 7 Drawing Sheets

Fig.13
Fig.14
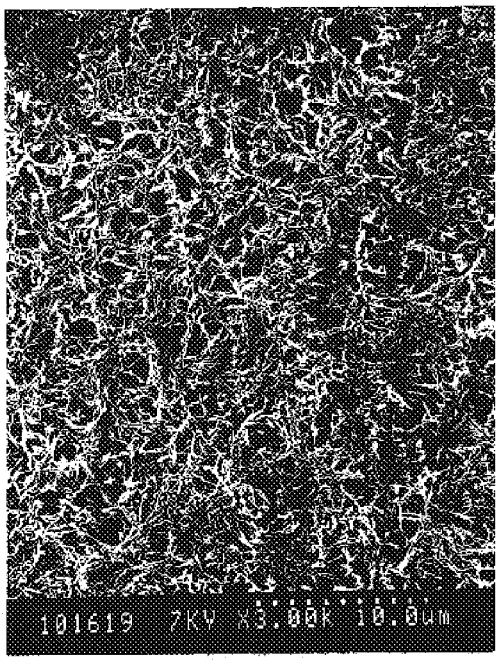
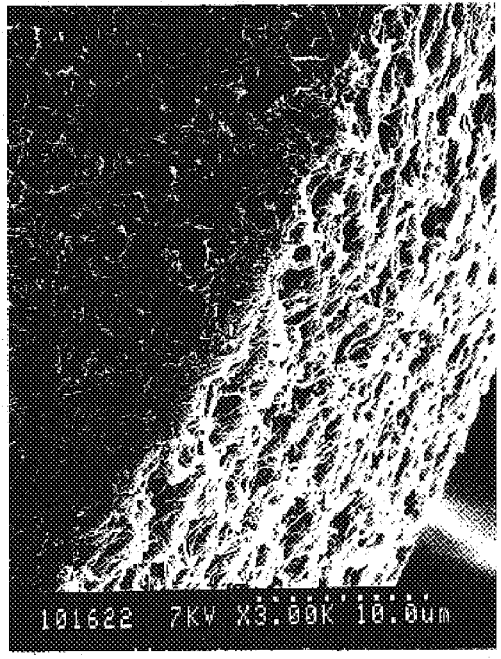

POROUS BEADS AND PROCESS FOR PRODUCING THE SAME

This application is the national phase under 35 U.S.C. §371 of PCT International Application No. PCT/JP00/08074 which has an International filing date of Nov. 16, 2000, which designated the United States of America.

BACKGROUND OF THE INVENTION

1. Field of the Invention

The present invention relates to porous beads. More particularly, the present invention is concerned with substantially spherical porous beads of an aromatic polyether ketone resin, which have an average particle diameter of 50 to 5,000 μm and a porosity of 40 to 99%. The porous beads of the present invention have various excellent properties, such as high resistance to heat and chemicals, and a high capability to prevent dust generation, and by virtue of these excellent properties, the porous beads of the present invention can be advantageously used as various carriers for separation of a substance (such as a carrier for chromatography and an enzyme-immobilized carrier) and as filter materials for use in the field of water treatment. Especially, the porous beads of the present invention have not only a high heat resistance, but also a high resistance to hydrolysis, a high capability to prevent dust generation and a high porosity, and exhibit only a small pressure loss and, hence, the porous beads of the present invention can be advantageously used as filter materials for treating a heater drainage and the like from a nuclear power plant or a thermal power plant, in which the treatment is conducted by contacting the filter material with the heater drainage to remove impurities, such as ferric components, from the drainage. Further, the present invention is also concerned with a method for producing the above-mentioned porous beads having high resistance to heat and chemicals, and a high capability to prevent dust generation. By the use of the method of the present invention, it becomes possible to produce porous beads having a desired average particle diameter and a desired porosity, with ease.

2. Prior Art

A polyether ketone resin is a resin having a high chemical stability, which has, for example, high resistance to heat and solvents. One example of the aromatic polyether ketone resin is a poly(oxy-1,4-phenylene oxy-1,4-phenylene-carbonyl-1,4-phenylene) which is generally known as poly (ether ether ketone) or PEEK. PEEK has a high melting point (334° C.) and a high glass transition temperature (143° C.), and is a thermoplastic, crystalline polymer having excellent properties, such as a high heat resistance, a high chemical stability and a high resistance to hydrolysis. The high chemical stability of PEEK is an advantageous and useful property for a membrane and, hence, it has been attempted to use PEEK for production of membrane filters (in the form of porous hollow fibers, porous flat membranes and the like) since a long time ago. However, when PEEK is used as a material for producing porous materials, such as porous hollow fibers and sheet-type separation membranes, by wet process or thermally induced phase separation process, the types of solvents and the temperatures, which both can be employed for the production of the porous materials, are limited due to the intrinsic high chemical stability of PEEK. Therefore, it has been difficult to produce porous materials from PEEK.

Unexamined Japanese Patent Application Laid-Open Specification No. 4-170445 discloses porous micro-particles of an aromatic polyether ketone resin. The porous microparticles disclosed in this patent document have a small particle diameter, namely only 1 μm to 40 μm, so that the use of such microparticles as a separation carrier or a filter material is accompanied by the following problems.

When particulate porous materials (porous partiales) are used as a separation carrier or a filter material, in general, a packed bed of the porous particles is provided in a column (or a tower) having, at a lower portion thereof, a porous support for retaining the porous particles, and a liquid is passed or filtered through the packed bed. When the particle diameter of the porous particles is small, the pressure loss becomes large, so that it is difficult to prepare a packed bed having a satisfactory thickness. In addition, when the pore diameter of the porous particles is small, there is a necessity to decrease the pore diameter of the porous support and in turn the small pore diameter of the porous support causes an increase in pressure loss.

In order to increase the throughput of a separation or filtration apparatus, it is necessary to increase the number of columns (towers) and/or the surface area of the porous support. A conceivable measure for increasing the surface area of the porous support is to use, as the porous support, a hollow fiber filter, a pleats filter or the like (which has a large surface area per unit volume thereof), which has formed thereon a coating (formed by deposition) of the porous particles. However, when such hollow fibers having a coating of porous particles are used in a filter module for use in an application field where the heat stability and chemical stability of PEEK are important, for example, in a filter module for removing impurities, such as ferric components, from hot water (such as a heater drainage and the like from a nuclear power plant or a thermal power plant) or for the treatment of polar solvents, the use of the filter module encounters problems of poor heat resistance and solvent resistance of the materials (other than PEEK) used for producing the filter module. Specifically, for example, in a hollow fiber module prepared by fluid-tightly fixing a bundle of hollow fibers in a module casing, the low heat resistance and solvent resistance of an adhesive used for fixing the follow fibers to the module casing are likely to become serious problems in the treatment of the above-mentioned hot water.

As examples of materials for producing the filter modules, which materials need to exhibit high resistance to heat and solvents, there can be mentioned a sintered filter made of stainless steel and a stainless steel filter. Even when these materials are used, the increase in the surface area for increasing the throughput of the filter modules is accompanied by problems that the construction of the column (or tower) becomes complicated and that the whole apparatus, including the column (or tower), becomes large, thereby increasing the cost of equipment.

Further, Unexamined Japanese Patent Application Laid-Open Specification No. 4-170445 discloses porous microparticles of an aromatic polyether ketone resin. The porous microparticles disclosed in this patent document have thin scale-like or thread-like projections (hereinfater, frequently referred to simply as "projections") of the polymer constituting the particles. When such particles get in contact with each other, the projections come off the particles and generate dust. Therefore, when the porous microparticles disclosed in this patent document are used, for example, for filtration, the filtration will be accompanied by a pressure loss which is caused not only due to the small particle diameter of the microparticles, but also by the dust generated from the projections which have come off the microparticles.

In addition, when such microparticles (beads) which are likely to generate dust are packed in a column and used for filtration, the filtration will be accompanied by not only a large pressure loss, but also a serious problem that the dust itself becomes a waste which harmfully affects the filtration operation. Specifically, most of the projections which have come off the particles are accumulated on the porous support of the column, while some of the projections pass through the porous support. In general, the pore diameter of the porous support is designed taking into consideration the particle diameter of the particles used as a separation carrier and, thus, the projections (having a size far smaller than that of the particles) which have come off the particles easily pass through the pores of the porous support. The dust (projections) which has passed through the porous support moves through various conduits and causes clogging in other equipment connected to the filtration apparatus. For example, the dust is caused to adhere to the inner walls of the conduits of the heat exchanger, thereby forming scale-like deposits, which cause problems, such as a marked lowering of the heat conductivity.

SUMMARY OF THE INVENTION

In this situation, the present inventors have made extensive and intensive studies with a view toward developing porous beads which not only have excellent resistance to heat and chemicals, but also exhibit only a small pressure loss, so that the beads can be used for the filtration of a large volume of hot water or for the adsorption of impurities contained in hot water. As a result, it has unexpectedly been found that, when porous beads are produced by a method mentioned below, the produced porous beads not only have a large average particle diameter and a high porosity, and exhibit a pressure loss which is very small, but also have high resistance to heat, chemicals and hydrolysis. The method comprises: mixing, while heating, an aromatic polyether ketone resin with a solvent capable of dissolving the resin to thereby obtain a resin solution; dispersing the resin solution in a liquid dispersion medium which is incapable of dissolving the resin and is non-miscible with the solvent, to thereby obtain a dispersion having the resin solution dispersed therein in the form of globules; cooling the dispersion while maintaining the dispersed form of the resin solution in the liquid dispersion medium, to thereby solidify the resin in the resin solution; and separating the solidified resin from a mixture of the solvent and the liquid dispersion medium. Further, with respect to the porous beads produced by the above-mentioned method, the present inventors have found that the porous beads have continuous pores in a three-dimensional network, that porous beads are smooth and, hence, are unlikely to generate dust, and that the porous beads are skinless.

The present invention has been completed, based on the above-mentioned novel findings.

Accordingly, it is an object of the present invention to provide porous beads which can be used as a filter material or adsorbent which not only has high resistance to heat, chemicals and hydrolysis, but also has an excellent capability to prevent dust generation and high mechanical strength, and exhibits a pressure loss which is very small.

It is another object of the present invention to provide a method for producing porous beads, which is advantageous in that the particle diameter and porosity of the porous beads can be easily controlled.

The foregoing and other objects, features and advantages of the present invention will be apparent to those skilled in the art from the following detailed description and the appended claims taken in connection with the accompanying drawings.

BRIEF DESCRIPTION OF THE DRAWINGS

In the drawings:

FIG. 13 is an electron photomicrograph of a part of a cross-section of one of the porous beads produced in Example 3, wherein the photomicrograph is taken, at an inner peripheral portion of the porous bead, from directly above the part of the cross-section of the porous bead, with a high magnification (×3,000); and FIG. 14 is an electron photomicrograph of a part of a cross-section of one of the porous beads produced in Example 3, wherein the photomicrograph is taken, at an inner peripheral portion of the porous bead, with a high magnification (×3,000).

DETAILED DESCRIPTION OF THE INVENTION

Figure 1:
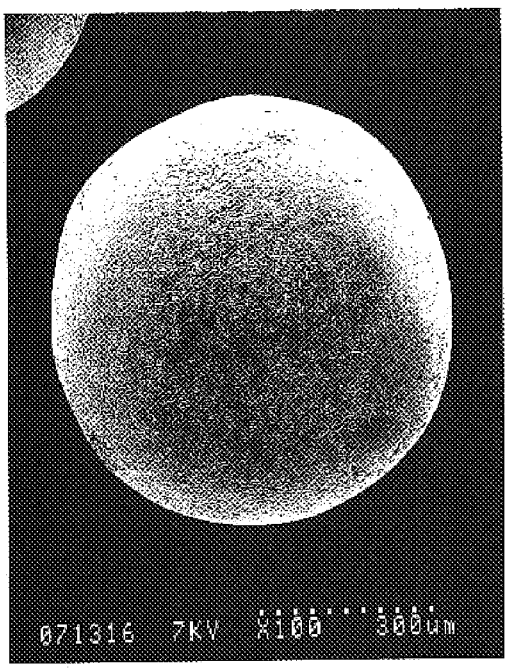
FIG. 1 is an electron photomicrograph (×100) showing a plan view of the whole body of one of the porous beads produced in Example 1.

In one aspect of the present invention, there is provided substantially spherical porous beads of an aromatic polyether ketone resin, which have an average particle diameter of 50 to 5,000 μm and a porosity of 40 to 99%.

For easy understanding of the present invention, the essential features and various embodiments of the present invention are enumerated below.

1. Substantially spherical porous beads of an aromatic polyether ketone resin, which have an average particle diameter of 50 to 5,000 μm and a porosity of 40 to 99%.

2. The porous beads according to item 1 above, wherein the aromatic polyether ketone resin is a thermoplastic, crystalline polymer having a glass transition temperature of at least 130° C.

3. The porous beads according to item 1 or 2 above, wherein the porous beads have all of the following characteristics:

(1) the porous beads have continuous pores in a three-dimensional network, (2) the porous beads are smooth, and (3) the porous beads are skinless.

4. A method for producing porous beads, which comprises:

(a) mixing, while heating, an aromatic polyether ketone resin with a solvent capable of dissolving the resin to thereby obtain a resin solution;

(b) dispersing the resin solution in a liquid dispersion medium which is incapable of dissolving the resin and is non-miscible with the solvent, to thereby obtain a dispersion having the resin solution dispersed therein in the form of globules;

(c) cooling the dispersion while maintaining the dispersed form of the resin solution in the liquid dispersion medium, to thereby solidify the resin in the resin solution; and (d) separating the solidified resin from a mixture of the solvent and the liquid dispersion medium, thereby obtaining substantially spherical porous beads of the aromatic polyether ketone resin.

5. mixing of the resin with the solvent in step (a) is performed at a temperature of 200° C. or higher.

6. The method according to item 4 or 5 above, wherein the solvent consists essentially of carbon, hydrogen and oxygen atoms.

Hereinbelow, the present invention will be described in detail.

The porous beads of the present invention are composed of an aromatic polyether ketone resin. In the present invention, the aromatic polyether ketone resin means a resin comprising recurring units each independently represented by following formula (1):

(1)

where in each of Ar and Ar' independently represents an aromatic group, wherein Ar contains at least one diaryl ketone linkage, and each of Ar and Ar' is covalently bonded to an ether group at an aromatic carbon atom of the aromatic group Ar or Ar'; m represents an integer of from 0 to 2; and n is 1 or 2.

Specific examples of Ar groups include groups respectively represented by the following formulae:

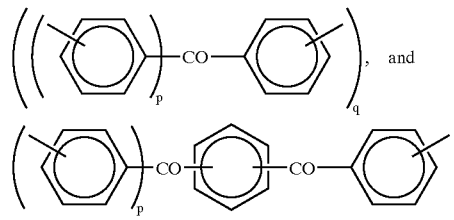

wherein each of p and q independently represents an integer of from 1 to 3.

Specific examples of Ar' groups include groups respectively represented by the following formulae:

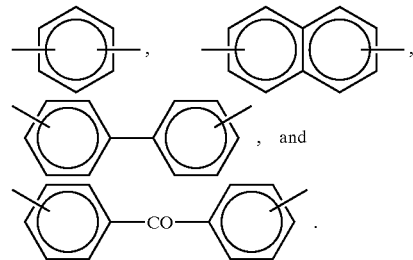

In the present invention, it is especially preferred that the aromatic polyether ketone resin comprises recurring units each independently represented by formulae (2) to (18) below. The aromatic polyether ketone resin used in the present invention may be a homopolymer consisting of any one of the below-mentioned recurring units, or a copolymer comprising two or more different recurring units. Further, the aromatic polyether ketone resin can be a mixture of two or more different homopolymers or copolymers.

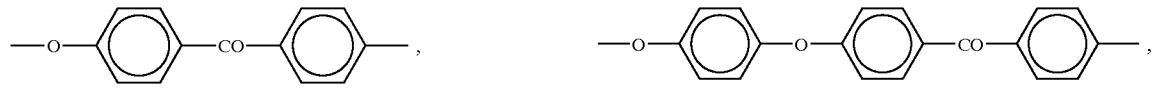
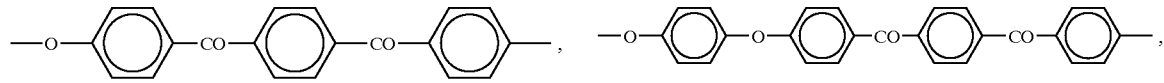
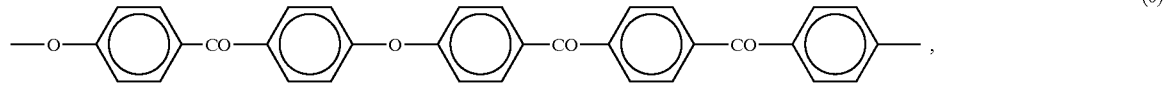

-continued

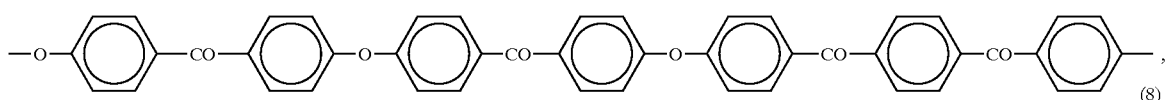(7)

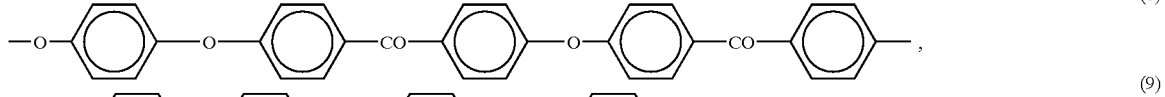(8)

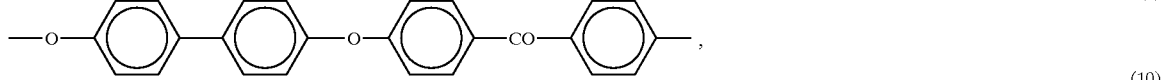(9)

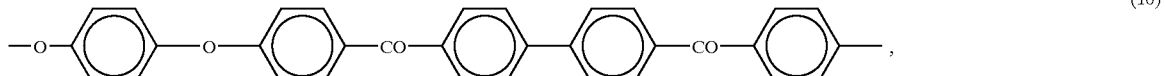(10)

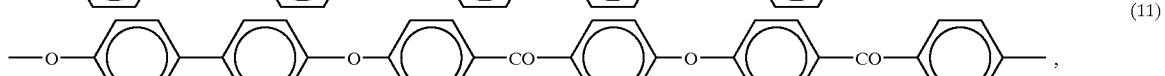(11)

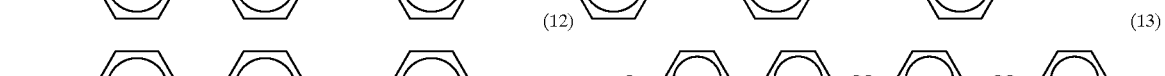(12)

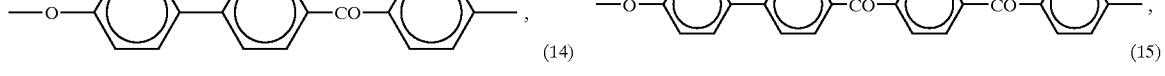(13)

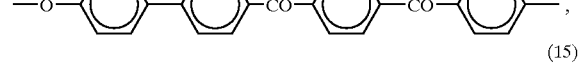

(14)

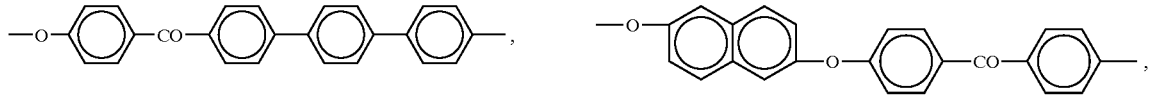(15)

(16)

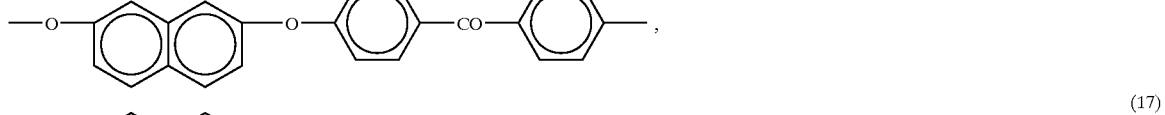(17)
, and (18)

In the above-mentioned formulae (2) to (18), a part or all of the hydrogen atoms contained in the aromatic rings may be replaced by a substituent. Examples of substituents include a halogen atom, a nitro group, a nitrile group, an amino group, a phenoxy group, a phenyl group, a biphenyl group, an alkyl group, a hydroxyl group and substituents respectively represented by the following formulae:

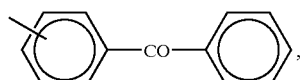,

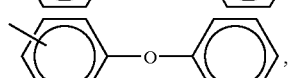,

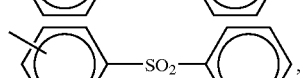,

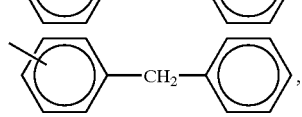,

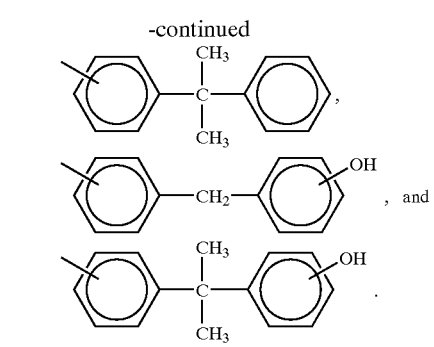

Generally, each of the terminals of the aromatic polyether ketone resin used in the present invention is independently a phenyl group, a halogen atom, a biphenyl group, a nitrile group, a nitro group, a phenoxy group or a group represented by the following formula:

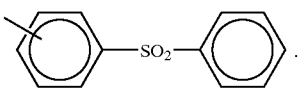.

Further, the aromatic polyether ketone resin may contain recurring units other than represented by formula (1) above so long as the inherent advantageous properties of the aromatic polyether ketone resin are not markedly lowered. Specifically, the aromatic polyether ketone resin may contain the following comonomer units:
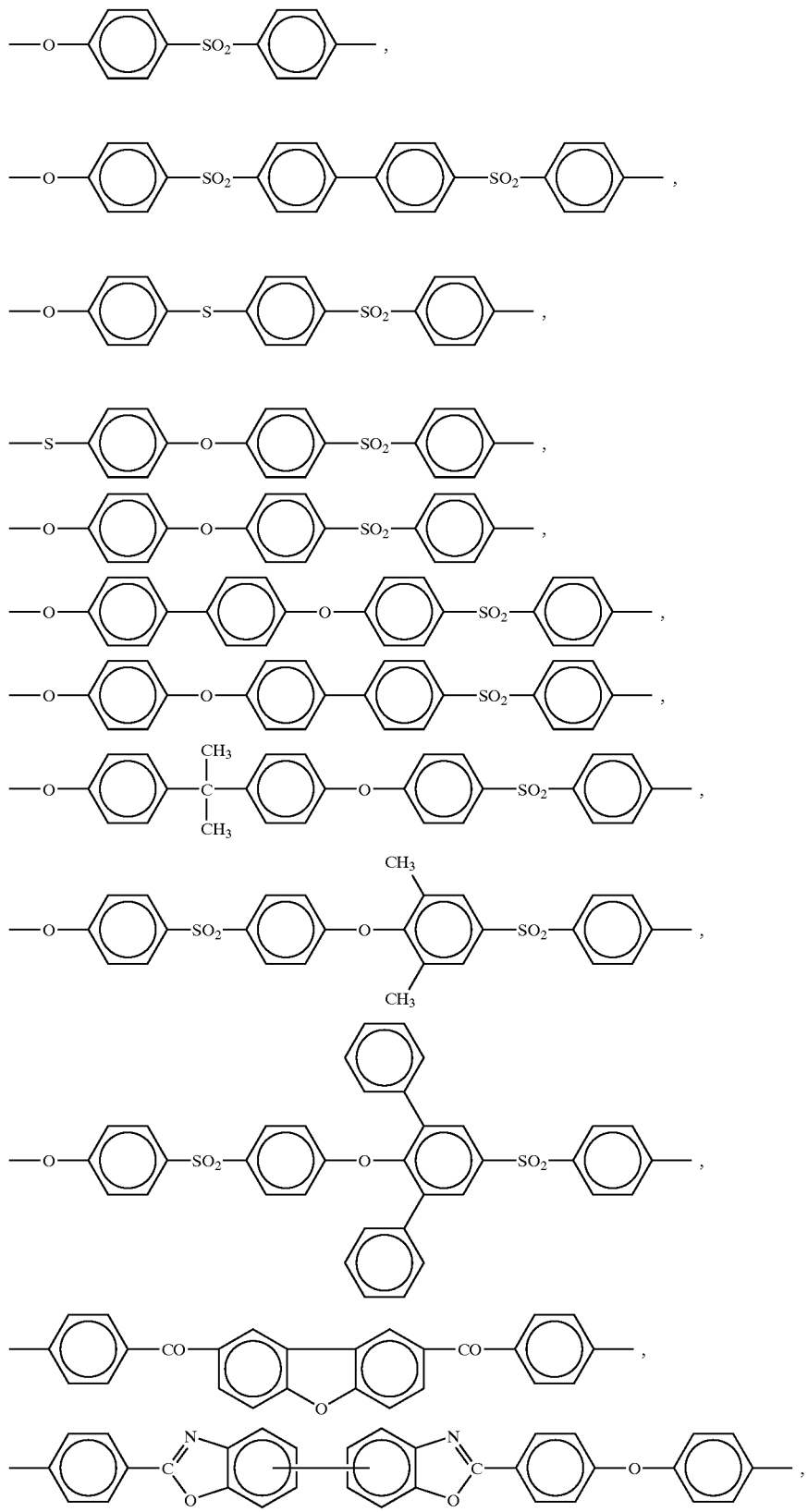

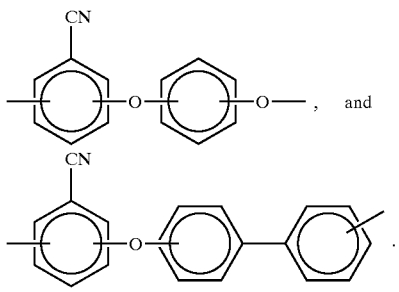

In the present invention, from the viewpoint of achieving excellent heat resistance and chemical stability, it is preferred that the porous beads are produced from an aromatic polyether ketone resin which is a thermoplastic, crystalline polymer having a glass transition temperature of at least 130° C. Specifically, it is preferred to use an aromatic polyether ketone resin which is a homopolymer comprising any one of the recurring units represented by formulae (2) to (6) above, namely a polyether ketone (PEK) unit, a poly ether ether ketone (PEEK) unit, a polyether ketone ketone (PEKK) unit, a polyether ether ketone ketone (PEEKK) unit and a polyether ketone ether ketone ketone (PEKEKK). Among these, especially preferred are a homopolymer comprising PEK units, each represented by formula (2) above, and a homopolymer comprising PEEK units, each represented by formula (3) above. Such aromatic polyether ketone resins are advantageous in that they not only exhibit excellent heat resistance and chemical stability, but also are commercially available and can be obtained with relative ease.

The average pore diameter of the porous beads of the present invention is 50 μm to 5,000 μm. When the porous beads have an average pore diameter of less than 50 μm, it is not practical to pack such beads in a column (or tower), because the pressure loss becomes large. On the other hand, when porous beads having an average pore diameter of more than 5,000 μm are packed in a column (or tower), gaps formed between the porous beads in the column become large, thereby causing disadvantages that the filtration efficiency is lowered and that the surface area of the beads per unit volume of the column (or tower) is decreased, so that the porous beads packed in the column do not exhibit satisfactory adsorption efficiency. The average pore diameter of the porous beads is preferably from 100 μm to 4,500 μm, more preferably from 150 μm to 4,000 μm, most preferably from 200 μm to 3,500 μm. When the porous beads having such an average pore diameter are packed in a column (or tower), the packed beads exhibit a small pressure loss, a good balance of the volume of gaps (formed between the beads) and the surface area of the beads, and a high adsorption efficiency.

The pore diameter of the porous beads can be measured by various methods, for example, by using an optical microscope, a scanning electron microscope, a laser scattering particle size distribution analyzer, and the like. In the present invention, the average pore diameter of the porous beads is measured using a laser scattering particle size distribution analyzer. However, it is difficult to measure particle diameters of large beads having a particle diameter of 1,000 μm or more by the laser scattering particle size distribution analyzer. Therefore, with respect to such large beads, the long axis and short axis of each of the bead are measured under the scanning electron microscope, and the average of the long axis and the short axis is defined as the particle diameter of the bead.

The porous beads of the present invention are substantially spherical, and there is no particular limitation to the sphericity of the porous beads. With respect to each of the porous beads, it is preferred that the ratio of the long axis to the short axis is 1.8 or less, more advantageously 1.5 or less.

The porous beads of the present invention have a porosity of 40 to 99%, preferably 45 to 97%, more preferably 50 to 95%. The porous beads having a porosity within the above-mentioned range are advantageous from the viewpoint of practical use, because such porous beads have a good balance of specific surface area and strength, and exhibit properties which are necessary for an adsorbent, a separation carrier or a filter material. When the porosity is less than 40%, the performance of the porous beads used as an adsorbent, a separation carrier or a filter material becomes unsatisfactory. On the other hand, when the porosity is more than 99%, the strength of the beads becomes insufficient for practical use. In the present invention, the "porosity" of the porous beads is defined by the following formula:

$$Pr = \frac{W_1 - W_0}{W_1 - W_0 + \frac{W_0}{\rho}} \times 100$$

wherein Pr represents the porosity (%), $W_1$ represents the wet weight (g) of the beads, $W_0$ represents the dry weight (g) of the beads, and ρ represents the specific gravity of the raw material aromatic polyether ketone resin.

The wet weight ($W_1$) and dry weight ($W_0$) of the porous beads are determined in the following manner. First, 1 g of dried porous beads are added to 100 ml of ethanol to saturate the porous structures of the beads with the ethanol. Next, the ethanol containing the beads is filtered through a filter paper, thereby recovering the wet beads. The recovered wet beads as such (without being dried) are dispersed in water and filtered through a filter paper. The above-mentioned operations for dispersion and filtration are repeated 10 times, thereby obtaining wet beads which have a satisfactory water content. The obtained wet beads are spread over a dry filter paper to remove an excess amount of water from the surfaces of the wet beads, and the weight (g) of the wet beads is measured. The measured weight of the wet beads is defined as the wet weight ($W_1$) of the porous beads. Subsequently, the wet beads are dried in vacuo for 24 hours, thereby obtaining dry beads. The weight (g) of the dry beads is measured and defined as the dry weight ($W_0$) of the porous beads.

In the present invention, it is preferred that the porous beads have all of the following characteristics:
(1) the porous beads have continuous pores in a three-dimensional network,
(2) the porous beads are smooth, and
(3) the porous beads are skinless.

In the present invention, the expression "continuous pores in a three-dimensional network" means that the pores of each porous bead form a continuous and three-dimensional network inside the bead. The three-dimensional network of pores can be confirmed, for example, by observing cross-sections of the beads under a scanning electron microscope (SEM). There is no particular limitation with respect to the method for cutting the beads to expose cross-sections for the SEM observation. For example, the beads can be cut by the following method. The beads are immersed in a liquid, such as ethanol, which has a low surface tension, and the beads and the liquid are encapsulated together in gelatin capsules. The resultant gelatin capsules are frozen in liquid nitrogen, thereby obtaining frozen beads in the gelatin capsules. The capsules containing the frozen beads are cut with a chisel or the like.

FIG. 13 is an electron photomicrograph of a part of a cross-section of one of the porous beads of the present invention, wherein the photomicrograph is taken, at an inner peripheral portion of the porous bead, from directly above the part of the cross-section of the porous bead, with a magnification of ×3,000. It can be confirmed from this photomicrograph that the fibrils of the polymer constituting the beads are entangled in a delicate, complicated manner to thereby form a three-dimensional network of pores in the beads.

In the porous beads of the present invention, the three-dimensional network of pores is uniformly formed, so that the pores communicate with each other (that is, a continuous network of pores is formed). In the present invention, the term"pores" means small voids formed in the polymer matrix of each porous bead, wherein voids run through the polymer matrix to thereby form a three-dimensional network structure. In the porous beads of the present invention, which have a substantially uniform three-dimensional network of pores, the pores communicate with each other, so that when the porous beads of the present invention are used as a filter material or adsorbent for water treatment, the water being treated permeates into and diffuses inside the beads. Therefore, the porous beads of the present invention exhibit a small pressure loss and a high adsorption rate, as compared to those of porous beads having no three-dimensional network of continuous pores. Specifically, when water is passed through a tower or column packed with the porous beads having no three-dimensional network of continuous pores, the flow path for water is limited only to the gaps formed between the beads. On the other hand, when the porous beads of the present invention which have the three-dimensional network of continuous pores are used for water treatment, water passes not only through the gaps between the beads, but also through the pores of the beads and, hence, it is apparent that the pressure loss can be greatly decreased.

Further, when the porous beads having no three-dimensional network of continuous pores are used as an adsorbent for water treatment, the water being treated reaches the inner adsorbing sites of the beads only through diffusion from the surface of the porous beads. On the other hand, in the case of the porous beads of the present invention which have a three-dimensional network of continuous pores, the water being treated can be forcibly caused to flow directly (not through diffusion) into the inner adsorbing sites of the porous beads. Therefore, the porous beads of the present invention are advantageous in that the beads exhibit a high adsorption rate and that even adsorbing sites present in an inner portion of the beads can be efficiently utilized.

In the present invention, the expression "the porous beads are smooth" means that the surface smoothness of the beads is not more than 1%, preferably not more than 0.5%. In the present invention, the "surface smoothness" is defined by the following formula:

$$S = H/D \times 100$$

wherein S represents the surface smoothness (%), H represents the height (μm) of projections present on the surface of the beads, and D represents the diameter (μm) of the beads.

The height (H) of the projections present on the surface of the beads and the diameter (D) of the beads can be measured using the SEM (scanning electron microscope) images. The diameter (D) is measured using a SEM image showing the whole body of a single porous bead. The diameter (D) is an average value of the long and short axes of the bead (that is, the particle diameter).

As in the case of the measurement of the diameter (D), the height (H) of the projections is measured using a SEM image showing the whole body of the porous bead. Each of the "projections present on the surface of the beads" is a part of the bead, which protrudes outwardly from the substantially spherical contour of the bead. If necessary, the surface of the bead can be observed under the SEM, while increasing the magnification within the range of from ×3,000 to ×10,000 until the height of the projections becomes detectable. The height of the largest projection is defined as the value H in the above-mentioned formula.

When the surface smoothness of the porous beads is more than 1%, scale-like or thread-like projections are present on the surface of the porous beads. When such beads having projections thereon are packed in a filtration tower or column and used for treating water, the porous beads get in contact with each other and are rubbed with each other to generate dust. The pressure loss is likely to increase as a result of the generation of dust. On the other hand, when the surface of the porous beads of an aromatic polyether ketone resin is smooth, there is no danger of the dust generation.

There is no particular limitation with respect to the method for evaluating the occurrence of dust generation, and, for example, the dust generation may be evaluated as follows. The porous beads are packed in a column and water is passed through the column. Water which has passed through the column is filtered through a membrane filter, such as a ultrafiltration membrane, and microparticles which are caught on the membrane are analyzed by infrared spectroscopy and the like. The occurrence of dust generation is confirmed when the microparticles are identified as a polyether ketone resin.

In the present invention, the term "skin" means a non-porous region present in a surface portion of the bead, which is a region where no pores having openings in the surface of the bead are observed when the outer peripheral portion and/or inner peripheral portion of the bead are observed under a SEM. In the present invention, "the porous beads are skinless" means that, by the SEM observation with a magnification of ×10,000, it is observed that a porous structure is uniformly formed throughout each porous bead (i.e., from the central portion to peripheral portion of the porous bead) and the pores open at the surface of each porous bead.

Figure 12:
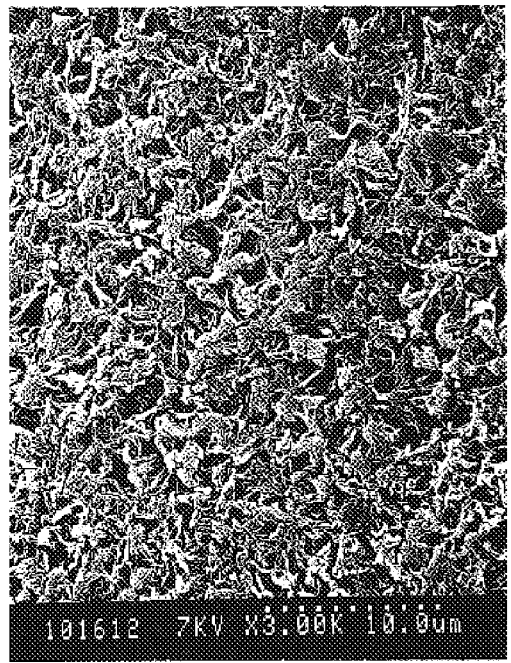
FIG. 12 is an electron photomicrograph showing a plan view of a part of the outer periphery of one of the porous beads produced in Example 3, wherein the photomicrograph is taken, at a central portion of the outer periphery of the porous bead, with a high magnification (×3,000)

FIG. 12 is an electron photomicrograph showing a plan view of a part of the outer periphery of one of the porous beads of the present invention, wherein the photomicrograph is taken, at a central portion of the outer periphery of the porous bead, with a magnification of ×3,000. It is apparent from FIG. 12 that the surface of the bead has pore openings and is skinless. Further, FIG. 14 is an electron photomicrograph of a part of a cross-section of one of the porous beads of the present invention, wherein the photomicrograph is taken, at an inner peripheral portion of the porous bead, with a magnification of ×3,000. It is apparent from FIG. 14 that, the inner peripheral portion of the porous bead also has a three-dimensional pore structure which is similar to that observed at the inner central portion of the bead, and that the outer periphery of the bead has a number of pore openings. Thus, the porous bead shown in FIG. 14 is skinless.

When the porous beads have skins, the adsorption efficiency of the beads becomes low, because, in such a case, the adsorption occurs only at the peripheral portions of the beads and the inner porous structure is not used for adsorption. On the other hand, when the porous beads are skinless, a high adsorption efficiency is achieved, because even large molecular weight substances can enter into the inner portions of the beads, so that the porous structures of the inner portions of the beads can also be utilized for adsorption.

With respect to the porous beads of the present invention, it is preferred that the fibrils constituting the matrix of the porous beads having the three-dimensional pore structure are thick at a peripheral portion thereof, as compared to the fibrils present at an inner portion of the porous beads. In the present invention, the term "fibrils" means fine polymer fibers constituting the matrix of the porous beads having the three-dimensional network of the continuous pores. When the fibrils are thick and strong, generation of dust from the porous beads are suppressed and the compressive strength of the porous beads becomes high. It is preferred that the ratio of the average thickness of the fibrils at a peripheral portion of the beads to the average thickness of the fibrils at an inner portion of the beads is 1.1 or more, more advantageously 1.2 or more, most advantageously 1.3 or more. When this ratio is less than 1.1, suppression of dust generation becomes unsatisfactory.

In the present invention, the average thickness of the fibrils is measured using a SEM image of the bead. Specifically, the average thickness of the fibrils at a peripheral portion of the bead can be measured using a SEM image showing the outer periphery of the porous bead, which is taken at a central portion of the outer peripheral portion of the porous bead. For measuring the average thickness of the fibrils at a peripheral portion of the porous bead, a circle having a predetermined diameter is drawn on the above-mentioned SEM image, and portions of the fibrils which underlap the circumference of the circle are observed. There is no particular limitation with respect to the diameter of the circle drawn on the SEM image, but it is preferred that the diameter is 10 to 50 μm in accordance with the scale of the SEM image. When the diameter of the circle is too small, only the thicknesses of the fibrils present at a local portion of the porous bead are measured. Further, it may result in the measurement of the thicknesses of only the fibrils which are positioned at inner portions below the peripheral portion of the bead.

The thickness of each fibril can be obtained as follows. In a plan view of the drawn circle on the SEM image, the circumference of the circle intersects the fibril in a widthwise direction of the fibril, and a portion of the fibril which portion is intersected by the circumference of the circle in the widthwise direction of the fibril has both terminal points, the straight distance of which defines the thickness of the fibril. Thus, the thickness of the fibril can be obtained by measuring the straight distance between two points on the circumference of the circle which are in registry with the both terminal points of the above-mentioned portion of the fibril. In the same manner as mentioned above, the thicknesses of all fibrils which are intersected by the circumference of the circle are measured, and the average value of the measured thicknesses is calculated to thereby obtain the average thickness of the fibrils at a peripheral portion of the porous bead.

In the same manner as mentioned above, the average thickness of the fibrils present in the inner portion of the bead is measured using a SEM image of a cross-section of the porous bead, which is taken, at a central portion of the bead, from directly above the cross-section of the bead. Specifically, a circle is drawn on the SEM image, and the thicknesses of portions of the fibrils which underlap the circumference of the circle are measured and the average value of the measured thicknesses is calculated to thereby obtain the average thickness of the fibrils at an inner portion of the porous bead. The diameter of the circle must be the same as that of the circle used for measuring the thicknesses of the fibrils at a peripheral portion of the bead.

Further, the specific surface area of the porous bead can be used as another index for the porosity of the porous bead of the present invention. There is no particular limitation with respect to the specific surface area of the porous beads, but the specific surface area is preferably 50 $m^2/g$ or more, more preferably 100 $m^2/g$ or more, most preferably 150 $m^2/g$ or more. When the specific surface area of the porous bead is less than 50 $m^2/g$, such porous beads are not suitable for use as an adsorbent, because the adsorption efficiency becomes low and the life of the adsorbent becomes short. The specific surface area of the bead can be measured by any of conventional methods, for example, by nitrogen adsorption method (BET method).

In addition, the average pore diameter can be used as still another index for the porosity of the porous beads of the present invention. There is no particular limitation with respect to the average pore diameter of the porous beads, but the average pore diameter is preferably 0.0001 μm to 5 μm, more preferably 0.001 μm to 1 μm. The average pore diameter of the beads can be measured by any of conventional methods, such as nitrogen adsorption method (BET method) and mercury porosimetry.

In the porous beads of the present invention, large voids may be present so long as no adverse effects are caused on the specific surface area and the strength of the beads. The "large voids" are defined as having a substantially spherical shape and a diameter which is at least 10 times the maximum pore diameter of the beads. When the porous beads of the present invention have the large voids, it is preferred that the walls of the large voids also have pores, which communicate with other pores.

Next, the method of the present invention for producing the porous beads is explained in detail below.

According to the present invention, there is provided a method for producing porous beads, which comprises:

(a) mixing, while heating, an aromatic polyether ketone resin with a solvent capable of dissolving the resin to thereby obtain a resin solution;

(b) dispersing the resin solution in a liquid dispersion medium which is incapable of dissolving the resin and is non-miscible with the solvent, to thereby obtain a dispersion having the resin solution dispersed therein in the form of globules;

(c) cooling the dispersion while maintaining the dispersed form of the resin solution in the liquid dispersion medium, to thereby solidify the resin in the resin solution; and (d) separating the solidified resin from a mixture of the solvent and the liquid dispersion medium, thereby obtaining substantially spherical porous beads of the aromatic polyether ketone resin. By the method of the present invention, it has become possible to easily produce not only the porous beads of the present invention, which have an average particle diameter of 50 to 5,000 μm and a porosity of 40 to 99%, but also other porous beads having an average particle diameter and a porosity which fall outside the ranges mentioned above.

In the method of the present invention, a uniform resin solution prepared by dissolving the resin in a solvent is mixed with a liquid dispersion medium which is incapable of dissolving the resin and is non-miscible with the solvent, to thereby obtain a dispersion having the resin solution dispersed therein in the form of globules. The resin in the resin solution is solidified by cooling the obtained dispersion while maintaining the dispersed form of the resin solution in the liquid dispersion medium, to thereby form resin particles in the liquid dispersion medium. In such a formation of resin particles as mentioned above, the growth of the network structure of the polymer fibrils in the particles is hindered at the interface between the resin particles being formed and the dispersion medium. Thus, it is considered that the polymer fibrils constituting the particles do not taper off at the surface of the particles and do not protrude outwardly from the substantially spherical contour of the particles, but the polymer fibrils are assembled into thick bundles at the surface of the particles, so that the overall surface of each of the obtained particles becomes smooth. On the other hand, in the conventional methods for producing the porous beads, crystal nuclei are formed in a diluted solution comprising a solvent and a resin and, then, the resin begins to crystallize around the crystal nuclei, thereby forming particles. At the final stage of the crystallization, due to the decrease in the amount of the non-crystallized resin present in the diluted solution, the polymer fibrils constituting the particles taper off at the surface of the particles and, finally, the growth of the tapering polymer fibrils terminates. As a result, the formed particles have many projections on the surface thereof. Thus, by the method of the present invention, it has become possible to produce excellent porous beads which cannot be produced by the conventional processes, i.e., porous beads which have continuous pores in a three-dimensional network, and which are smooth and skinless. Further, in the method of the present invention, by increasing the resin concentration of the resin solution, it becomes possible to thicken and strengthen polymer fibrils (constituting the matrix of each porous bead) without causing a marked decrease in the porosity of the porous beads and while maintaining the porous structure of the porous beads. Therefore, by the method of the present invention, it has become possible to produce porous beads having excellent capability to prevent dust generation and a high compression strength.

In the method of the present invention, there is no particular limitation with respect to the aromatic polyether ketone resin used for producing the porous beads, but the above-mentioned preferred aromatic poly ether ketone resins can be advantageously used for producing porous beads having high resistance to heat, chemicals and hydrolysis.

There is no particular limitation with respect to the solvent used for dissolving the resin so long as the solvent is capable of dissolving the aromatic poly ether ketone resin. It is preferred that the solvent used in the method of the present invention is a polar organic solvent capable of uniformly dissolving at least 5% by weight, more preferably at least 10% by weight of the aromatic polyether ketone resin, at a temperature within the range of from 200° C. to the melting temperature of the resin. When the solvent used is capable of dissolving therein only less than 5% by weight of the resin, it becomes difficult to produce porous beads having an average particle diameter of 50 µm or more and having a strength sufficient for practical use.

Specific examples of solvents which can be used in the method of the present invention include aliphatic sulfones, such as sulfolane; aromatic sulfones, such as diphenyl sulfone; aromatic ketone compounds, such as diphenyl ketone; and xanthone compounds. Among the above-exemplified solvents, preferred are solvents, each consisting essentially of carbon, hydrogen and oxygen atoms. With respect to the solvent used for producing the porous beads, it is possible that the solvent remains inside the porous beads even after the above-mentioned separation step (d) of the method of the present invention. When a solvent containing sulfur (S) in a molecular structure thereof (such as sulfolane) remains inside the porous beads, the porous beads may suffer difficult problems which are caused by sulfur. Specifically, when the porous beads containing sulfolane therein are contacted with a heater drainage of a thermal power plant and the like (which is hot water having a temperature of about 200° C.) for the purpose of removing impurities (such as ferric components), the sulfur components derived from sulfolane remaining inside the porous beads are converted into sulfate radicals. The sulfate radicals cause problems, such as sulfonation of porous beads, which results in the lowering of the strength of the porous beads. Further, it is possible that the sulfate radicals which have been eluted from the porous beads cause corrosion of the conduits of the thermal power plant. Therefore, when a sulfur-containing solvent (such as sulfolane) is used, a complicated washing process becomes necessary for completely removing the residual solvent from the produced porous beads. On the other hand, such a complicated washing process is unnecessary when the porous beads are produced using a solvent which consists essentially of carbon, hydrogen and oxygen atoms.

As examples of solvents consisting essentially of carbon, hydrogen and oxygen atoms, there can be mentioned aromatic ketone compounds and xanthone compounds. An aromatic ketone compound is a compound represented by the following formula:

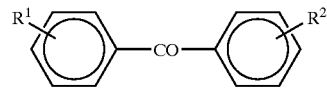

wherein each of $R^1$ and $R^2$ independently represents a hydrogen atom, an alkyl group having 1 to 3 carbon atoms or a phenyl group.

Specific examples of aromatic ketone compounds include diphenyl ketone, 4-methyl diphenyl ketone, 4-phenyl diphenyl ketone, and 4,4'-dimethyl diphenyl ketone. As the solvent used in the method of the present invention, dipheny ketone is preferred from a viewpoint of heat stability and commercial availability.

A xanthone compound is a compound represented by the following formula:

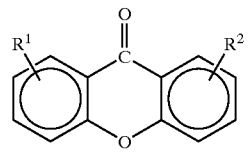

wherein each of $R^1$ and $R^2$ independently represents a hydrogen atom, an alkyl group having 1 to 3 carbon atoms or a phenyl group.

Specific examples of xanthone compounds include xanthone, 2-phenyl anthone, 2-methyl anthone and 1,3-dimethyl anthone. As the solvent used in the method of the present invention, anthone is preferred from a viewpoint of heat stability and commercial availability.

The above-exemplified aromatic ketone compounds and anthone compounds have structures which are similar to that of an aromatic polyether ketone resin. With respect to such ketone compounds and anthone compounds, it is considered that, due to such a similarity in structure, the aromatic polyether ketone resin exhibits excellent solubility in these compounds. In addition, the high heat stability of these compounds allows the solvents to be recycled repeatedly. This is another reason why these solvents are preferred in the method of the present invention.

In the method of the present invention, the use of a solvent (such as concentrated sulfuric acid) which causes sulfonation of an aromatic polyether ketone resin at room temperature should be avoided.

In the method of the present invention, first, a resin solution is obtained by mixing, while heating, an aromatic polyether ketone resin with a solvent capable of dissolving the resin. The ratio of the resin to the solvent in the resin solution may be appropriately selected depending on the desired porosity of the porous beads. The preferred resin concentration of the resin solution is from 5 to 50% by weight, more preferably from 7 to 40% by weight, most preferably from 10 to 30% by weight, based on the total weight of the resin and the solvent. By decreasing the resin concentration, porous beads having high porosity can be obtained, but the strength of the beads is lowered. On the other hand, when the resin concentration is increased, the porosity of the porous beads is lowered, but the strength of the beads is improved. In addition, the porosity of the porous beads varies depending on the type of the solvent, wherein the use of different solvents results in the difference in porosity even if the resin concentrations of resin solutions containing the different solvents are the same. The reason for this is considered that the difference in miscibility with the resin between the different solvents results in the different porosities of the porous beads.

The temperature for mixing the resin with the solvent may vary depending on the type of the solvent. In the method of the present invention, the mixing is generally performed at a temperature which is lower than the boiling point of the solvent used and at which the resin is completely dissolved in the solvent used. Specifically, it is preferred that the mixing of the resin with the solvent is performed at 200° C. or higher, more preferably 210° C. or higher, more preferably 220° C. or higher, most preferably 230° C. or higher. Such a mixing temperature is preferred, because the resin dissolves uniformly in the solvent at 200° C. or higher. Since an aromatic polyether ketone resin has a high glass transition temperature and a high melting point, and has a high heat resistance and a high chemical stability, even when any one of the above-mentioned polar solvents is used, it is difficult to dissolve uniformly the resin at a temperature lower than 200° C. When the aromatic polyether ketone resin is not dissolved uniformly in the solvent, porous beads having a uniform three-dimensional network of pores and a high porosity cannot be obtained.

Further, with respect to the mixing temperature for dissolving the resin in the solvent, it is preferred that the mixing temperature is around the boiling point of the solvent. When the mixing is performed while heating under reflux at a temperature around the boiling point of the solvent, it becomes possible to control the temperature of a system for dissolving the resin by utilizing the latent heat of vaporization of the solvent, to thereby suppress a local increase in temperature. Therefore, the porous beads having a uniform porosity and a uniform particle diameter can be produced with ease. There is no particular limitation with respect to the time of heating so long as the resin dissolves uniformly in the solvent. For improving the productivity of the porous beads by using a short heating time, it is preferred that the resin to be mixed with the solvent is one obtained by pulverizing resin pellets. When a solvent which is likely to decompose at high temperatures is used, it is necessary to use a short heating time.

The resin solution may further contain an additional component (hereinafter, frequently referred to as a "third component") other than the resin and the solvent in an amount wherein the solubility of the resin in the solvent is not harmfully affected. Examples of third components include solvents and non-solvents, which are used in the conventional methods for producing porous particles having high porosity, and metal particles. It is one of the advantages of the present invention that porous beads having a high porosity and a large specific surface area can be obtained without using such a third component; however, such a third component may be used to adjust the porosity and the like of the porous beads. Specifically, for example, it is possible to use a resin solution which contains metal particles which function as fillers. In this case, the produced porous beads are treated with an acid and the like to remove the metal particles, thereby forming further pores in the porous beads.

Next, the above-obtained resin solution is dispersed in a liquid dispersion medium. It is important that the liquid dispersion medium used in the present invention is incapable of dissolving the aromatic polyether ketone resin and is non-miscible with the solvent. Further, the liquid dispersion medium is selected from liquids which satisfy the following requirements: that the liquids are stable at a temperature necessary for keeping the solution of the resin dissolved in the solvent (that is, a temperature at which the resin remains completely dissolved in the solvent), that the liquids have boiling points higher than the temperature necessary for keeping the solution of the resin dissolved in the solvent, that the liquids have fluidity, and that the liquids are non-miscible with the resin solution. When the boiling point of the liquid dispersion medium is lower than the temperature necessary for keeping the solution of the resin dissolved in the solvent, the following problem is likely to occur. When the resin solution is dispersed in the liquid dispersion medium, heat is released as the latent heat of the liquid dispersion medium before the temperature of the resultant dispersion reaches a temperature necessary for keeping the solution of the resin dissolved in the solvent, and the uniformity of the resin solution dispersed in the liquid dispersion medium in the form of globules becomes lowered. Further, when the liquid dispersion medium is miscible with the solvent at the temperature necessary for keeping the solution of the resin dissolved in the solvent, the resin solution cannot be separated into globules and, thus, the porous beads cannot be produced.

Examples of liquid dispersion media which are advantageously used in the method of the present invention include silicone oils, mineral oils, paraffins and liquid paraffins, and mercury. For example, when polyether ether ketone (PEEK) is used as the resin and diphenyl ketone is used as the solvent, a silicone oil is preferably used as the liquid dispersion medium. With respect to the combination of the solvent and the dispersion medium, it should be noted that, for example, a liquid paraffin is miscible with diphenyl ketone at a temperature necessary for dissolving PEEK in diphenyl ketone and, therefore, porous beads cannot be produced by the combination of diphenyl ketone and liquid paraffin.

There is no particular limitation with respect to the mixing ratio of the liquid dispersion medium to the resin solution, but for efficiently producing the porous beads of the present invention, it is preferred that the weight ratio of the liquid dispersion medium to the resin solution is from 0.7 to 10, more advantageously from 0.8 to 5, most advantageously from 0.9 to 2. The weight of the resin solution is the total weight of the raw material resin and the solvent. When the liquid dispersion medium is used in too large an amount, the size of the system for preparing the dispersion becomes too large, so that it becomes difficult to disperse uniformly the resin solution in the form of globules by agitation and the like. On the other hand, when the liquid dispersion medium is used in too small an amount, the globules of the resin solution are likely to assemble due to the large amount of the resin solution, so that it becomes difficult to disperse uniformly the resin solution in the form of globules. As a result, the particle diameters of the produced porous beads become non-uniform.

There is no particular limitation with respect to the method for mixing the resin solution with the liquid dispersion medium so long as solidification of the resin by the lowering of the temperature does not occur during the mixing. Specifically, the resin solution may be added to the liquid dispersion medium, or alternatively, the liquid dispersion medium may be added to the resin solution. When the temperature of the resin solution is rapidly lowered to a temperature below the phase separation point of the resin solution during the mixing of the resin solution with the liquid dispersion medium, the produced porous beads are likely to suffer difficult problems, such as non-uniform pore diameter and a low porosity.

There is no particular limitation with respect to the method for dispersing the resin solution in the form of globules. For example, the dispersion of the resin solution globules may be formed by agitation method, ultrasonic method or emulsification method. These methods can be used individually or in combination. In the method of the present invention, the particle diameter of the porous beads can be controlled by selecting an appropriate method for dispersing the resin solution in the form of globules, and an appropriate viscosity of the dispersion system, including the resin, the solvent and the liquid dispersion medium. For obtaining relatively large porous beads having a particle diameter of 100 μm to 5,000 μm, it is advantageous to prepare the dispersion by agitation method. On the other hand, for obtaining relatively small porous beads having a pore diameter of 100 μm or less, it is advantageous to prepare the dispersion by ultrasonic method. However, the method for preparing the dispersion is not limited to these two methods. In each of these methods, it is important that a mixture of the resin solution and the liquid dispersion medium as a whole should be uniformly agitated by mechanical agitation or ultrasonic vibration. When the resin solution is not dispersed uniformly, the particle diameter of the porous beads becomes non-uniform.

Subsequently, the dispersion is cooled while maintaining the dispersed form of the resin solution in the liquid dispersion medium, to thereby solidify the resin in the resin solution. There is no particular limitation with respect to the method for cooling the dispersion, and the dispersion may be allowed to stand so as to be cooled naturally or may be forcibly cooled by means of a cooling medium provided outside a reactor containing the dispersion. The cooling rate can be controlled by using the cooling medium. When the cooling rate is too high, a temperature variation is caused inside the globules of the resin solution which are present in the liquid dispersion medium, and this results in the non-uniform structure of the porous beads and sometimes causes the formation of the above-mentioned skins. Therefore, it is preferred that the cooling rate is low. Specifically, the cooling rate is preferably not more than 3° C./minute, more preferably not more than 1° C./minute, most preferably not more than 0.5° C./minute.

Next, the solidified resin is separated from a mixture of the solvent and the liquid dispersion medium, thereby obtaining substantially spherical porous beads of the aromatic polyether ketone resin. There is no particular limitation with respect to the method for separating the solidified resin from the mixture, and the separation can be conducted by any of the methods used in the conventional process, that is, the conventional methods for separating porous particles from a solvent and the like. The appropriate separation method may vary depending on the type of the solvent used and the liquid dispersion medium used. For example, when the liquid dispersion medium is a silicone oil, the produced porous beads can be recovered by filtration and the like, and the solvent remaining inside the porous beads and the silicone oil adhering to the surface of the porous beads can be sequentially replaced by methylene chloride, acetone, ethanol and water.

The porous beads of the present invention can be advantageously used as carriers for separation of a substance (such as a carrier for chromatography and an enzyme-immobilized carrier). Especially, since the porous beads of the present invention are composed of an aromatic polyether ketone resin, the porous beads exhibit excellent properties, such as high resistance to heat and hydrolysis. Further, the porous beads of the present invention have excellent structural characteristics, such as a large average pore diameter and a smooth surface which suppresses dust generation. By virtue of such excellent structural characteristics, the porous beads of the present invention exhibit only a small pressure loss, and is free from problems caused by a waste resulting from the dust. The porous beads of the present invention also have a large specific surface area and a high porosity. Thus, the porous beads of the present invention have excellent properties and characteristics which are advantageous for use in various water treatments. The porous beads of the present invention are especially useful for treating a heater drainage and the like from a nuclear power plant or a thermal power plant, which is a hot water having a temperature about 200° C. Specifically, the porous beads can be advantageously used as a filter material for removing impurities, such as ferric components, from the heater drainage.

BEST MODE FOR CARRYING OUT THE INVENTION

Hereinbelow, the present invention will be described in more detail with reference to the following Examples, but they should not be construed as limiting the scope of the present invention.

In the following Examples, various characteristics and properties of the porous beads were evaluated by the following methods.

(1) Average Particle Diameter

The average particle diameter of the porous beads is measured using a laser scattering particle size distribution analyzer (LA-910, manufactured and sold by HORIBA Seisakusho Co., Ltd., Japan).

However, when the porous beads contain a number of large beads having a particle diameter of 1,000 μm or more, the average diameter of the porous beads cannot be measured by the laser scattering particle size distribution analyzer and, hence, is determined by observing the porous beads under a scanning electron microscope (SEM) (S-800 type, manufactured and sold by Hitachi, Ltd., Japan). Specifically, with respect to each of the porous beads appearing in a SEM image, the long axis and short axis of the porous bead are measured, and the average value of the long and short axes of the porous bead is defined as the particle diameter of the porous bead. Then, the average value of the particle diameters of the beads appearing in the SEM image is calculated to obtain the average particle diameter of the porous beads.

(2) Porosity 1 g of dried porous beads are added to 100 ml of ethanol to saturate the porous structures of the beads with the ethanol. The ethanol containing the beads is filtered through a filter paper to recover the wet beads. Next, the recovered wet beads (without being dried) are dispersed in water and filtered through a filter paper. The above-mentioned operations for dispersion and filtration are repeated 10 times, thereby obtaining wet porous beads having a satisfactory water content. The obtained wet porous beads are spread over a dry filter paper to remove an excess amount of water from the surfaces of the wet beads, and the weight (g) of the wet porous beads is measured. The measured weight of the wet beads is defined as the wet weight ($W_1$) of the porous beads. Subsequently, the wet porous beads are dried in vacuo for 24 hours, thereby obtaining dry porous beads. The weight (g) of the dry porous beads is measured and defined as the dry weight ($W_0$) of the porous beads. The porosity (Pr)

of the porous beads is determined in accordance with the following formula:

$$Pr = \frac{W_1 - W_0}{W_1 - W_0 + \frac{W_0}{\rho}} \times 100$$

wherein Pr represents porosity (%), $W_1$ represents the wet weight (g) of the beads, $W_0$ represents the dry weight (g) of the beads, and p represents the specific gravity ($\rho$=1.32) of the raw material aromatic polyether ketone resin (trade name: PEEK450G, manufactured and sold by VICTREX plc, England).

(3) Specific Surface Area and Average Pore Diameter

After drying the porous beads in vacuo at room temperature, the specific surface area and average pore diameter of the porous beads are measured by BET method using a BET analyzer (trade name: AUTOSORB-1, manufactured and sold by Quanta Chrome Instruments, USA).

(4) Observation of the Porous Beads Under a Scanning Electron Microscope

The porous beads are observed under a scanning electron microscope (SEM) (S-800 type, manufactured and sold by Hitachi, Ltd., Japan).

(5) Cutting of the Porous Beads

After drying the porous beads in vacuo at room temperature, the dried beads are immersed in ethanol so as to impregnate the porous beads with ethanol. The ethanol-impregnated porous beads as such are encapsulated in gelatin capsules (diameter: 5 mm), and the resultant gelatin capsules are frozen in liquid nitrogen, thereby obtaining frozen beads in the gelatin capsules. The capsules containing the frozen beads are cut with a chisel. The cut beads are selected from all beads contained in the capsule and used as a specimen for microscopic observation.

The cut porous beads, as well as the intact porous beads, are observed under a scanning electron microscope (SEM) (S-800 type, manufactured and sold by Hitachi Ltd., Japan).

(6) Surface Smoothness

With respect to a single porous bead, the diameter thereof and the height of the projections present on the surface of the porous bead are measured using a SEM image. Specifically, the long axis and short axis of the porous bead are measured and the average value of the long and short axes are defined as the diameter of the porous bead. The height (H) of the projections present on the surface of the beads is obtained by measuring the lengths of projections of the porous bead, which protrude outwardly from the substantially spherical contour of the bead. The length of the largest projection is defined as the height (H) of the projections. The surface smoothness of the porous bead is determined in accordance with the following formula:

$S = H/D \times 100$ wherein S represents the surface smoothness (%), H represents the height ($\mu$m) of the projections present on the surface of the bead, and D represents the diameter ($\mu$m) of the bead.

(7) Average Thickness of Fibrils

The average thickness of the fibrils (constituting the matrix of the bead) at a peripheral portion of the porous bead is measured using a SEM image showing an outer periphery of the porous bead, wherein the SEM image is taken directly above a central portion of the outer periphery of the porous bead. Further, the average thickness of the fibrils at an inner portion of the porous bead is measured using a SEM image of a cros-ssection of the porous bead, wherein the SEM image is taken, at a central portion of the cross-section of the porous bead, from directly above the cross-section of the porous bead.

Specifically, each of the above-mentioned average thicknesses of the fibrils is measured as follows. A circle having a diameter of 10 $\mu$m in accordance with the scale of the SEM image is drawn on the SEM image at around the center thereof. In a plan view of the drawn circle on the SEM image, the circumference of the circle intersects the fibril in a widthwise direction of the fibril, and a portion of the fibril which portion is intersected by the circumference of the circle in the widthwise direction of the fibril has both terminal points, the straight distance of which defines the thickness of the fibril. Thus, the thickness of the fibril can be obtained by measuring the straight distance between two points on the circumference of the circle which are in registry with the both terminal points of the above-mentioned portion of the fibril.

In the same manner as mentioned above, the thicknesses of all fibrils which are intersected by the circumference of the circle are measured, and the average value of the measured thicknesses is calculated to thereby obtain the average thickness of the fibrils.

EXAMPLE 1

20 g of PEEK (trade name: PEEK450G, manufactured and sold by VICTREX plc, England) comprising recurring units each represented by formula (3) above was added to 80 g of heated sulfolane (manufactured and sold by Tokyo Kasei Kogyo Co., Ltd., Japan), and the resultant mixture was heated at 286° C. under nitrogen-sealed conditions for 30 minutes, thereby obtaining a uniform, brown transparent resin solution.

To the obtained uniform resin solution (PEEK solution) was added 100 g of silicone oil (trade name: SRX310) (manufactured and sold by Toray Dow Corning Co. Ltd., Japan). The silicone oil was divided into several portions and portionwise added to the resin solution so as to prevent a lowering of the temperature of the resin solution, and the resultant mixture was agitated for 30 minutes to thereby obtain a dispersion. The agitation of the mixture was conducted using an agitator ("Three One Motor" manufactured and sold by Heidon, Japan) equipped with Teflon agitating blade at a rotation speed of 300 rpm.

The dispersion obtained in a container used for the above-mentioned agitation was allowed to cool in air to room temperature, while continuing the agitation, thereby forming white beads dispersed in the silicone oil.

The obtained beads were taken out of the container, and the sulfolane remaining inside the beads and silicone oil adhering to the surface of the beads were extracted with methylene chloride (manufactured and sold by WAKO PURE CHEMICAL Industries, Ltd., Japan). The methylene chloride was replaced with acetone and ethanol in this order, and the ethanol was then replaced by water, thereby obtaining porous beads.

The average particle diameter and porosity of the porous beads were 538 $\mu$m and 85%, respectively. The specific surface area of the porous beads was 215 m$^2$/g.

Further, the cross-section and surface of the porous beads were examined under a scanning electron microscope (SEM). The results are shown in FIGS. 1 to 4.

FIG. 1 is an electron photomicrograph (×100) showing a plan view of the whole body of one of the obtained porous beads. It is apparent from this photomicrograph that the outer periphery of the porous bead has a high porosity and that the porous bead is spherical.

Figure 2:
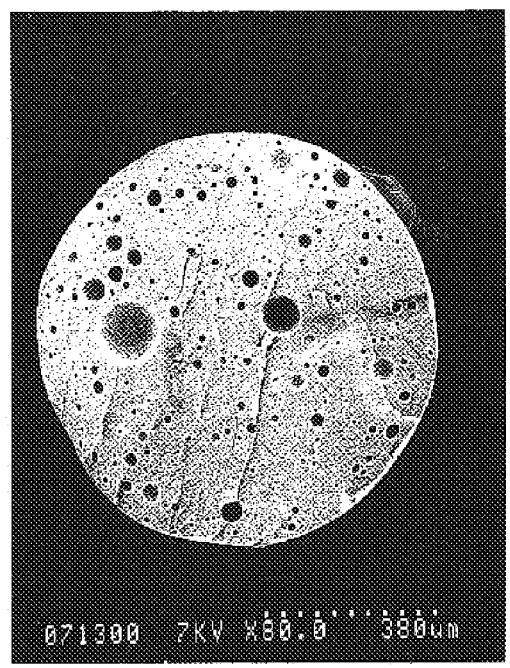
FIG. 2 is an electron photomicrograph (×80) showing a cross-section of the whole body of one of the porous beads produced in Example 1, wherein the photomicrograph is taken from directly above the cross-section of the whole body of the porous bead.

FIG. 2 is an electron photomicrograph (×80) showing a cross-section of the whole body of one of the obtained porous beads, wherein the photomicrograph was taken from directly above the cross-section of the porous bead. The presence of the so-called "large voids" defined above can be confirmed in the cross-section of the porous beads.

Figure 3:
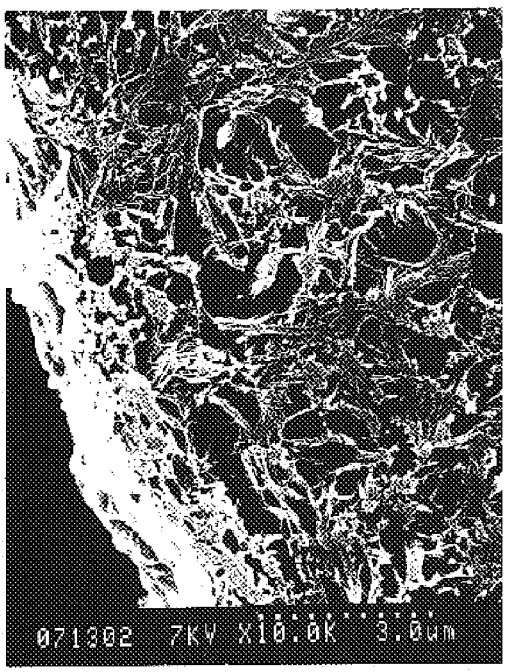
FIG. 3 is an electron photomicrograph of a part of a cross-section of one of the porous beads produced in Example 1, wherein the photomicrograph is taken, at an inner peripheral portion of the porous bead, from directly above the part of the cross-section of the porous bead, with a high magnification (×10,000)

FIG. 3 is an electron photomicrograph of a part of a cross-section of one of the obtained porous beads, wherein the photomicrograph was taken, at an inner peripheral portion of the porous bead, from directly above the part of the cross-section of the porous bead with a magnification of ×10,000. The cross-sections of the peripheral and inner portions of the porous bead are, respectively, shown at the left-hand and righ-thand portions of the photomicrograph. From the photomicrograph, it was observed that the peripheral portion of the bead had a three-dimensional network of continuous pores and the outer periphery of the bead had a number of pore openings. Thus, it is apparent that the bead had no skin. Further, the height of the largest projection present on the surface of the bead was 0.35 µm, and the diameter of the beads, which was determined from FIG. 2, was 935 µm. Accordingly, the surface smoothness of this bead was 0.04%.

Figure 4:
FIG. 4 is an electron photomicrograph of a part of the outer periphery of one of the porous beads produced in Example 1, wherein the photomicrograph is taken, at a central portion of the outer periphery of the porous bead, with a high magnification (×10,000)

FIG. 4 is an electron photomicrograph of a part of the outer periphery of one of the obtained porous beads, wherein the photomicrograph was taken, at a central portion of the outer periphery of the porous bead, with a magnification of ×10,000. It can be confirmed from this photomicrograph that the outer periphery of the porous bead had a number of pore openings and that the porous bead was skinless.

Thus, from these observations it is apparent that the porous beads produced in Example 1 had continuous pores in a three-dimensional network, that the porous beads were smooth, and that the porous beads were skinless.

Further, the average thicknesses of the fibrils were measured using the photomicrographs. The average thickness of the fibrils at a peripheral portion of the porous bead was 0.51 µm, whereas the average thickness of the fibrils at an inner portion of the porous bead, which fibrils are shown in the cross-section of the porous bead, was 0.21 µm. The ratio of the average thickness of the fibrils at a peripheral portion of the porous bead to the average thickness of the fibrils at an inner portion of the porous bead was 2.4. This means that the average thickness of the fibrils constituting the porous beads of the present invention is larger at a peripheral portion of the porous beads than at an inner portion of the beads.

EXAMPLE 2

Porous beads were produced in substantially the same manner as in Example 1, except that diphenyl ketone was used instead of sulfolane, and the resin was dissolved in diphenyl ketone at 305° C. (boiling point of diphenyl ketone).

The average particle diameter of the obtained porous beads could not be measured using a laser scattering particle size distribution analyzer and, hence, was measured by observation under a SEM in accordance with the above-mentioned method. As a result, it was found that the average particle diameter of the porous bead was 1,990 µm, and the porosity of the porous bead was 73%.

Further, the cross-section and surface of the porous bead were examined under a SEM. The results are shown in FIGS. 5 to 8.

Figure 5:
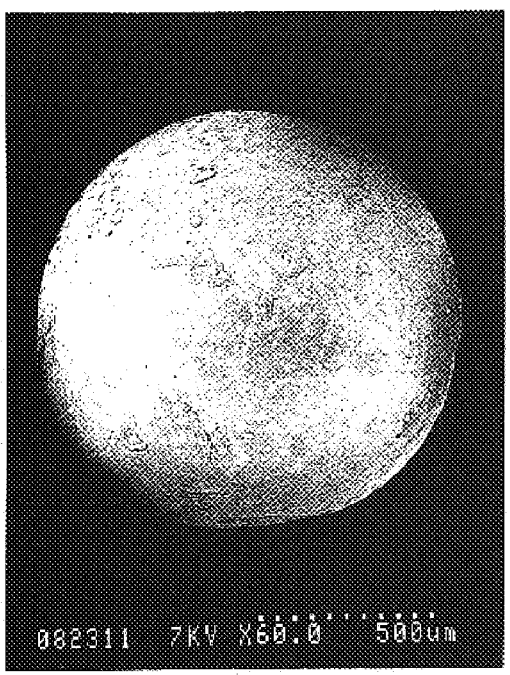
FIG. 5 is an electron photomicrograph (×60) showing a plan view of the whole body of one of the porous beads produced in Example 2.

FIG. 5 is an electron photomicrograph (×60) showing a plan view of the whole body of one of the obtained porous beads. From this photomicrograph it is apparent that the surface of the porous bead had a high porosity and that the porous bead was spherical.

Figure 6:
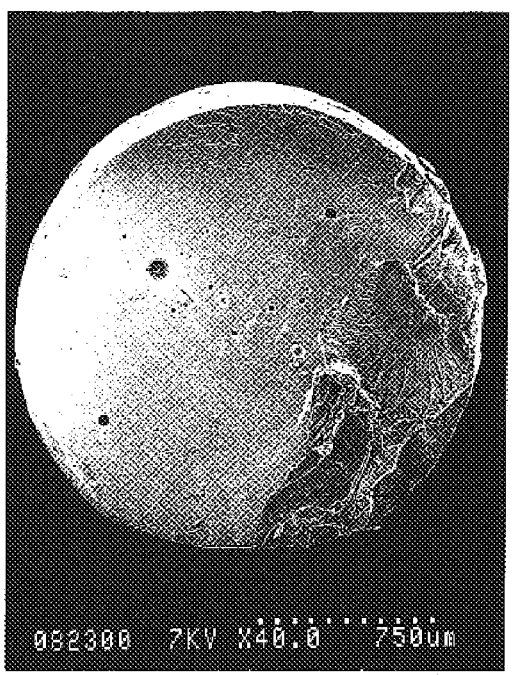
FIG. 6 is an electron photomicrograph (×40) showing a cross-section of the whole body of one of the porous beads produced in Example 2, wherein the photomicrograph is taken from directly above the cross-section of the porous bead.

FIG. 6 is an electron photomicrograph (×40) showing a cross-section of the whole body of one of the obtained porous beads, wherein the photomicrograph was taken from directly above the cross-section of the porous bead. The presence of the so-called "large voids" defined above can be confirmed on the cross-section of the porous bead.

Figure 7:
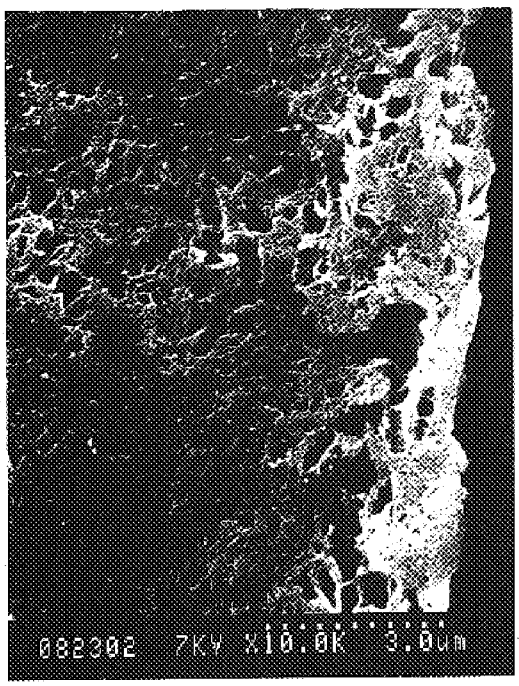
FIG. 7 is an electron photomicrograph of a part of a cross-section of one of the porous beads produced in Example 2, wherein the photomicrograph is taken, at an inner peripheral portion of the porous bead, from directly above the cross-section of the porous bead, with a high magnification (×10,000)

FIG. 7 is an electron photomicrograph of a part of a cross-section of one of the obtained porous beads, wherein the photomicrograph was taken, at an inner peripheral portion of the porous bead, from directly above the cross-section of the porous bead, with a magnification of ×10,000. The cross-sections of the inner and peripheral portions of the porous bead are, respectively, shown at the left-hand and right-hand portions of the photomicrograph. From the photomicrograph, it is observed that the peripheral portion of the bead had a three-dimensional network of continuous pores and the outer periphery of the bead had a number of pore openings. Thus, it is apparent that the bead had no skin. Further, the height of the largest projection present on the outer periphery of the bead was 0.7 µm, and the diameter of the bead which was determined from FIG. 6 was 1,990 µm. Accordingly, the surface smoothness of the beads was 0.04%.

Figure 8:
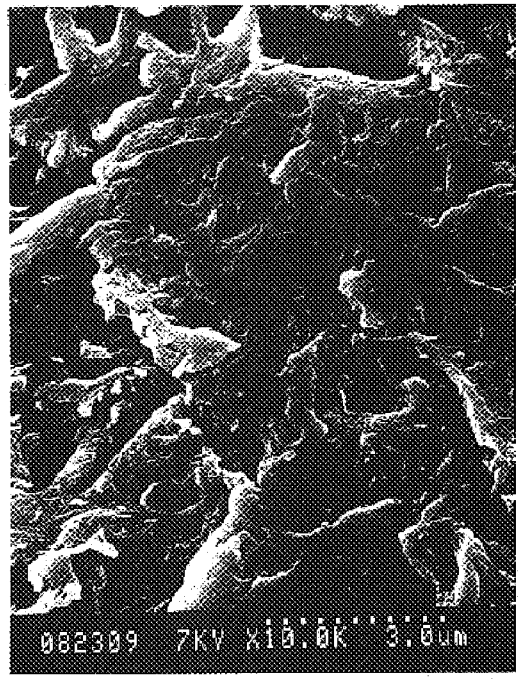
FIG. 8 is an electron photomicrograph showing a plan view of a part of the outer periphery of one of the porous beads produced in Example 2, wherein the photomicrograph is taken, at a central portion of the outer periphery of the porous bead, with a high magnification (×10,000)

FIG. 8 is an electron photomicrograph showing a plan view of a part of the outer periphery of one of the obtained porous beads, wherein the photomicrograph was taken, at a central portion of the outer periphery of the porous bead, with a magnification of ×10,000. From this photomicrograph it can be confirmed that the porous bead had a number of pore openings in the outer periphery thereof and that the porous bead was skinless.

From these observations it is apparent that the porous beads produced in Example 2 had continuous pores in a three-dimensional network, that the porous beads were smooth, and that the porous beads were skinless.

Further, the average thicknesses of the fibrils were measured using the photomicrographs. As a result, it was found that the average thickness of the fibrils at a peripheral portion of the porous bead was 0.74 µm, and that the average thickness of the fibrils at an inner portion of the porous bead, which fibrils are observed in the cross-section of the porous bead, was thickness of the fibrils at a peripheral portion of the porous bead to the average thickness of the fibrils at an inner portion of the porous bead was 3.7. This means that the average thickness of the fibrils constituting the porous beads of the present invention is larger at a peripheral portion of the porous beads than at an inner portion of the beads.

EXAMPLE 3

Porous beads were produced in substantially the same manner as in Example 2, except that the amounts of PEEK and diphenyl ketone were changed to 10 g and 90 g, respectively.

The average particle diameter and porosity of the porous beads were 495 µm and 90%, respectively. The specific surface area of the porous beads was very high, namely 258 $m^2/g$. The average pore diameter of the porous beads was 0.014 µm.

Further, the cross-section and surface of the porous beads were examined under a scanning electron microscope (SEM). The results are shown in FIGS. 9 to 14.

Figure 9:
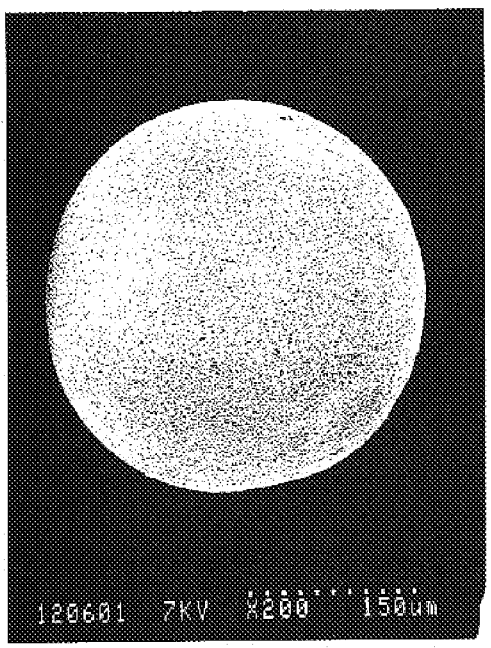
FIG. 9 is an electron photomicrograph (×200) showing a plan view of the whole body of one of the porous beads produced in Example 3.

FIG. 9 is an electron photomicrograph (×200) showing a plan view of the whole body of one of the obtained porous beads. From this photomicrograph it is apparent that the peripheral portion of the porous bead had a high porosity and that the porous bead was spherical.

Figure 10:
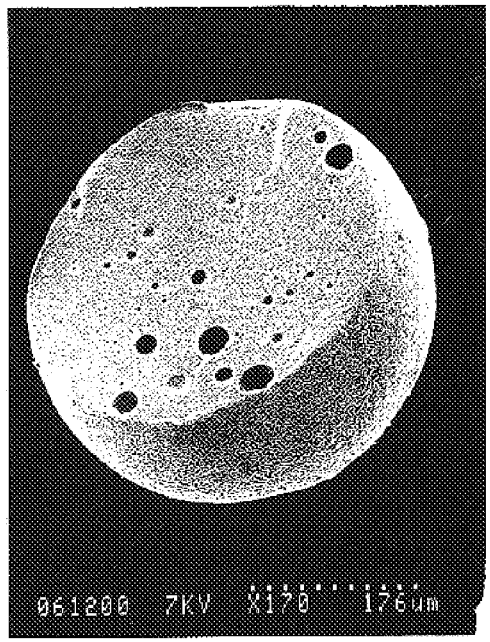
FIG. 10 is an electron photomicrograph (×170) showing a perspective view of a cross-section of the whole body of one of the porous beads produced in Example 3.

FIG. 10 is an electron photomicrograph (×170) showing a perspective view of a cross-section of the whole body of one of the obtained porous beads. The presence of the so-called "large voids" defined above can be confirmed in the cross-section of the porous bead.

Figure 11:
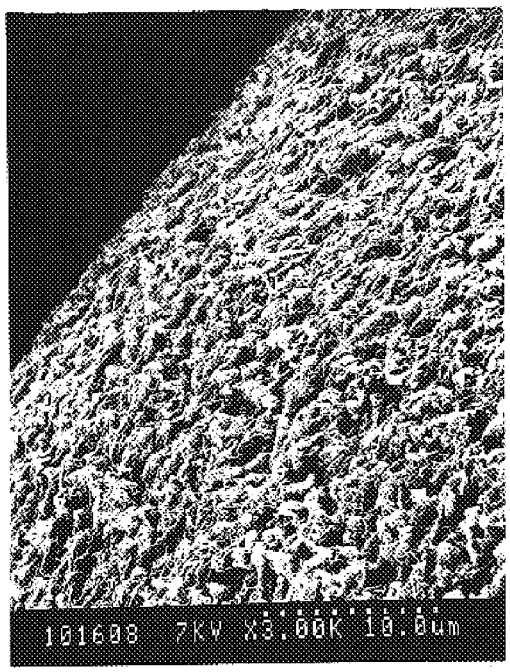
FIG. 11 is an electron photomicrograph of a part of the outer periphery of one of the porous beads produced in Example 3, wherein the photomicrograph is taken, at a partial profile portion of the porous bead, from directly above the part of the outer periphery of the porous bead, with a high magnification (×3,000)

FIG. 11 is an electron photomicrograph of a part of the outer periphery of one of the obtained porous beads, wherein the photomicrograph was taken, at a partial profile portion of the porous bead, from directly above the part of the outer periphery of the porous bead, with a magnification of ×3,000. It can be confirmed from this photomicrograph that the peripheral portion of the porous bead had a high porosity, and that the bead as a whole was smooth. Further, the height of the largest projection present on the surface of the bead was 0.5 μm, and the diameter of the bead which was determined from FIG. 9 was 343 μm. Accordingly, the surface smoothness of the beads was 0.15%.

FIG. 12 is an electron photomicrograph showing a plan view of a part of the outer periphery of one of the obtained porous beads, wherein the photomicrograph was taken, at a central portion of the outer periphery of the porous bead, with a magnification of ×3,000. It is apparent from this photomicrograph that the peripheral portion of the porous bead had a high porosity and the pore openings were present on the outer periphery thereof and hence, the porous bead was skinless.

FIG. 13 is an electron photomicrograph of a part of a cross-section of one of the obtained porous beads, wherein the photomicrograph was taken, at an inner peripheral portion of the porous bead, from directly above the part of the cross-section of the porous bead, with a magnification of ×3,000. It can be confirmed form this photomicrograph that the fine polymer fibrils are entangled in a complicated manner to thereby form a three-dimensional network of pores in the bead.

FIG. 14 is an electron photomicrograph of a part of a cross-section of one of the obtained porous beads, wherein the photomicrograph was taken, at an inner peripheral portion of the porous bead, with a magnification of ×3,000. The cross-sections of the peripheral and inner portions of the porous bead are, respectively, shown at the right-hand and left-hand portions of the photomicrograph. From this photomicrograph it can be confirmed that the peripheral portion of the porous bead also had a three-dimensional pore structure which is similar to that observed at the inner portion of the bead, and that the porous bead had a number of pore openings on the outer periphery thereof and hence, was skinless.

Further, the average thickness of the fibrils at a peripheral portion of the porous beads, which was measured using FIG. 12, was 0.67 μm, whereas the average thickness of the fibrils at an inner portion of the porous bead, which was measured using FIG. 13, was 0.35 μm. Accordingly, the ratio of the average thickness of the fibrils at a peripheral portion of the porous beads to the average thickness of the fibrils at an inner portion of the porous beads was 1.9. From these results it is apparent that the average thickness of the fibrils constituting the porous beads of the present invention is larger at a peripheral portion of the porous beads than at an inner portion of the beads.

As apparent from FIGS. 9 to 14, the pores are formed throughout the porous beads of the present invention and communicate with each other.

From the SEM images it is apparent that the porous beads of the present invention have continuous pores in a three-dimensional network, that the porous beads are smooth, and that the porous beads are skinless.

In addition, the heat resistance of the obtained porous beads was evaluated as follows.

Using a glove box, 250 ml of the porous beads and 250 ml of ultra-pure water were charged into an SUS tube under a nitrogen atmosphere, and, then, the SUS tube was hermetically sealed. The SUS tube containing the porous beads and the ultra-pure water were placed in an oven at 200° C. and subjected to heat treatment for 100 hours. The structural characteristics of the porous beads which were evaluated before and after the heat treatment are shown in Table 1 below.

TABLE 1

|  | Before heat treatment | After heat treatment |
|---|---|---|
| Average pore diameter (μm) | 495 | 496 |
| Porosity (%) | 90 | 90 |
| Specific surface area (m²/g) | 258 | 250 |

It is apparent from Table 1 above that no significant changes in the structural characteristics of the porous beads occurred by the heat treatment. These results confirm the high heat resistance of the porous beads in hot water having a temperature of 200° C. The high heat resistance of the porous beads is considered to be caused by the high crystallinity of PEEK, which is an intrinsic characteristic of PEEK, and by the surface smoothness of the beads, which is one of the preferred characteristics of the porous beads of the present invention.

Further, the capability of the porous beads to prevent dust generation was also evaluated.

The porous beads were packed in a column, and water was passed through the column. Water which had passed through the column was subjected to ultrafiltration (molecular weight cutoff: 10,000) to catch microparticles on an ultrafiltration membrane. The microparticles were analyzed by infrared spectroscopy and identified as PEEK.

The amount of the microparticles of PEEK which were caught on the membrane was very small. Thus, it is apparent that the porous beads suffered substantially no dust generation.

INDUSTRIAL APPLICABILITY

The porous beads of the present invention have various excellent properties, such as high resistance to heat and chemicals, and a high capability to prevent dust generation, and by virtue of these excellent properties, the porous beads of the present invention can be advantageously used as various carriers for separation of a substance (such as a carrier for chromatography and an enzyme-immobilized carrier) and as filter materials and adsorbents in the field of water treatments (such as treatment of water used in the field of electronics, for example, in the production of semiconductor chips and the like), clinical equipments, pharmaceuticals and food processing. Especially, the porous beads of the present invention have not only a high heat resistance, but also a high resistance to hydrolysis, a high capability to prevent dust generation and a high porosity, and exhibit only a small pressure loss and, hence, the porous beads of the present invention can be advantageously used as filter materials for treating a heater drainage and the like from a nuclear power plant or a thermal power plant, in which the treatment is conducted by contacting the filter material with the heater drainage to remove impurities, such as ferric components, from the drainage. Further, by the use of the method of the present invention, it becomes possible to easily produce not only the above-mentioned porous beads of the present invention which have high resistance to heat, chemicals and hydrolysis, but also other porous beads having a desired average particle diameter and a desired porosity.

What is claimed is:

1. Substantially spherical porous beads of an aromatic polyether ketone resin, which have all of the following characteristics:

(1) said porous beads have an average particle diameter of 50 to 5,000 μm, (2) said porous beads have a porosity of 40 to 99%, (3) said porous beads have continuous pores in a three-dimensional network, (4) said porous beads are smooth, (5) said porous beads are skinless, and (6) said porous beads have fibrils constituting the matrix of said porous beads having the three dimensional pore structure, wherein ratio of the average thickness of the fibrils at a peripheral portion of the beads to the average thickness of the fibrils at an inner portion of the beads is 1.1 or more.

2. The porous beads according to claim 1, wherein said aromatic polyether ketone resin is a thermoplastic, crystalline polymer having a glass transition temperature of at least 130° C.

3. A method for producing porous beads, which comprises:

(a) mixing, while heating, an aromatic polyether ketone resin with a solvent capable of dissolving said resin to thereby obtain a resin solution;

(b) dispersing said resin solution in a liquid dispersion medium which is incapable of dissolving said resin and is non-miscible with said solvent, to thereby obtain a dispersion having said resin solution dispersed therein in the form of globules;

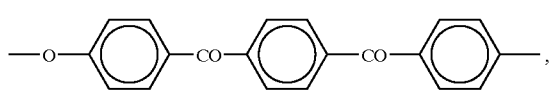

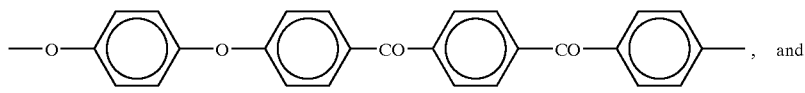

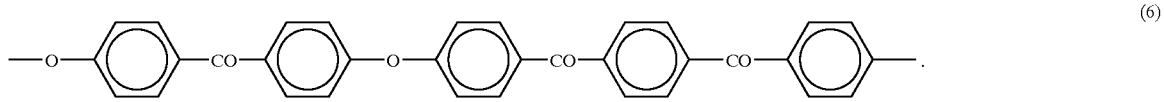

(c) cooling said dispersion while maintaining the dispersed form of said resin solution in said liquid dispersion medium, to thereby solidify the resin in said resin solution; and (d) separating the solidified resin from a mixture of said solvent and said liquid dispersion medium, thereby obtaining substantially spherical porous beads of said aromatic polyether ketone resin.

4. The method according to claim 3, wherein said mixing of said resin with said solvent in step (a) is performed at a temperature of 200° C. or higher.

5. The method according to claim 3 or 4, wherein said solvent consists essentially of carbon, hydrogen and oxygen atoms.

6. The method according to claim 3 or 4, wherein said resin solution is used without an additional component other than said resin and said solvent.

7. The porous beads according to claim 1, wherein said ratio of the average thickness of the fibrils at a peripheral portion of the beads to the average thickness of the fibrils at an inner portion of the beads is 1.2 or more.

8. The porous beads according to claim 1, wherein said ratio of the average thickness of the fibrils at a peripheral portion of the beads to the average thickness of the fibrils at an inner portion of the beads is 1.3 or more.

9. The porous beads according to claim 1, wherein the surface smoothness of said porous beads is not more than 1%, wherein said surface smoothness is defined by the following formula:

$$S = H/D \times 100$$

wherein S represents the surface smoothness (%), H represents the height ($\mu$m) of projections present on the surface of the beads, and D represents the diameter ($\mu$m) of the beads.

10. The porous beads according to claim 1, wherein said aromatic polyether ketone resin is a homopolymer comprising any one of the recurring units selected from the group consisting of a polyether ketone (PEK) unit, a polyether ether ketone (PEEK) unit, a polyether ketone ketone (PEKK) unit, a polyether ether ketone ketone (PEEKK) unit and a polyether ketone ether ketone ketone (PEKEKK) respectively represented by the following formulae (2) to (6):

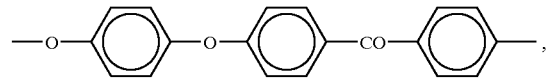

11. The porous beads according to claim 1, wherein said aromatic polyether ketone resin is a homopolymer comprising any one of the recurring units selected from the group consisting of a polyether ketone (PEK) unit and a polyether ether ketone (PEEK) unit respectively represented by formulae (2) and (3):

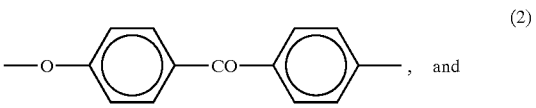

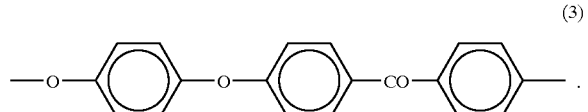

* * * * *